United States Patent
Goh et al.

(10) Patent No.: US 12,503,100 B2
(45) Date of Patent: Dec. 23, 2025

(54) SYSTEMS AND METHODS FOR PREVENTING UNCONTROLLABLE VEHICLE DRIFT

(71) Applicant: TOYOTA RESEARCH INSTITUTE, INC., Los Altos, CA (US)

(72) Inventors: Yan Ming Goh, Palo Alto, CA (US); Phung Xuan Nguyen, Mountain View, CA (US); Hanh Nguyen, Morgan Hill, CA (US); Izumi Karino, Morgan Hill, CA (US); James A. Dallas, Mountain View, CA (US); Michael Thompson, San Juan Capistrano, CA (US); Minoru Brandon Araki, Saratoga, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 18/194,979

(22) Filed: Apr. 3, 2023

(65) Prior Publication Data
US 2024/0326781 A1 Oct. 3, 2024

(51) Int. Cl.
*B60W 30/045* (2012.01)
*B60W 30/18* (2012.01)
(Continued)

(52) U.S. Cl.
CPC .... *B60W 30/045* (2013.01); *B60W 30/18145* (2013.01); *B60W 40/101* (2013.01);
(Continued)

(58) Field of Classification Search
CPC ......... B60W 30/045; B60W 30/18145; B60W 40/101; B60W 50/10; B60W 2050/0083;
(Continued)

(56) References Cited

U.S. PATENT DOCUMENTS 10,596,902 B2 3/2020 Lim
2013/0144476 A1\* 6/2013 Pinto ...................... B60L 50/00
903/930

(Continued)

FOREIGN PATENT DOCUMENTS

CN 114148411 A 3/2022
CN 114475545 A 5/2022
(Continued)

OTHER PUBLICATIONS

Goh, Jonathan Yan Ming, "Automated Vehicle Control Beyond the Stability Limits", 2019, Stanford University (Year: 2019).\*
(Continued)

*Primary Examiner* — Jelani A Smith
*Assistant Examiner* — George A Alcorn, III
(74) *Attorney, Agent, or Firm* — SHEPPARD, MULLIN, RICHTER & HAMPTON LLP; Daniel N. Yannuzzi

(57) ABSTRACT

Systems and methods provide for corrective assistance to maintain a stable controllable drift, while permitting a drift driving experience for the driver. Examples of the systems and methods disclosed herein include receiving first data corresponding to a current operational state of a vehicle while performing a controllable drift; receiving a request to operate the vehicle in a requested operational state; determining that the requested operational state exceeds a threshold operational state associated with an uncontrollable drift; and, in response to the determination, providing corrective assistance to operate the vehicle in a corrective operational state to prevent the vehicle from entering an uncontrollable drift.

20 Claims, 10 Drawing Sheets

(51) Int. Cl.
  *B60W 40/101* (2012.01)
  *B60W 50/038* (2012.01)
  *B60W 50/10* (2012.01)
  *B60W 50/12* (2012.01)
  *B60W 50/00* (2006.01)

(52) U.S. Cl.
  CPC ..... *B60W 50/10* (2013.01); *B60W 2050/0083* (2013.01); *B60W 2520/26* (2013.01); *B60W 2520/28* (2013.01); *B60W 2540/106* (2013.01)

(58) Field of Classification Search
  CPC ......... B60W 2520/26; B60W 2520/28; B60W 2540/106; B60W 30/02
  USPC .......................................................... 701/41
  See application file for complete search history.

(56) References Cited

U.S. PATENT DOCUMENTS

2019/0176801 A1* 6/2019 Ruybal .................... B60K 6/52
2020/0216085 A1* 7/2020 Bobier-Tiu ........... B60W 40/08
2020/0256444 A1   8/2020 Dumas
2024/0067209 A1* 2/2024 Bárdos ............... B60W 60/0011

FOREIGN PATENT DOCUMENTS

CN    114506327 A       5/2022
JP    2008087670 A  *   4/2008

OTHER PUBLICATIONS

Koo et al., "Nonlinear Tire Lateral Force versus Slip Angle Curve Identification," Proceedings of the 2004 American Control Conference, pp. 2128-2133, Jul. 1, 2004 (https://doi.org/10.23919/ACC.2004.1383775).

Chen et al., "Vehicle Sideslip Angle and Road Friction Estimation Using Online Gradient Descent Algorithm," IEEE Transactions on Vehicular Technology, 67(12):11475-11485, Oct. 11, 2018 (https://doi.org/10.1109/TVT.2018.2875459).

* cited by examiner

SYSTEMS AND METHODS FOR PREVENTING UNCONTROLLABLE VEHICLE DRIFT

TECHNICAL FIELD

The present disclosure relates generally to automotive systems and technologies, and more particularly, some embodiments relate to automated systems which control a vehicle during grip driving and drift driving.

DESCRIPTION OF RELATED ART

A few current technologies consider automated or autonomous control of a vehicle while drifting/sliding/slipping. Drifting occurs when the rear tires of a vehicle lose traction with the road surface. More specifically, there is a limit to the amount of lateral frictional force a vehicle's tires can exert on a road surface. Within this peak force limit, a vehicle operates in a grip driving operating range (e.g., the range of operating conditions where the vehicle's tires maintain traction with the road's surface). Past this peak force limit, the tires will saturate (e.g., lose traction with the road), and enter a drift driving operating range.

BRIEF SUMMARY OF THE DISCLOSURE

According to various embodiments of the disclosed technology, systems and methods for managing vehicles to mitigate risk to the vehicles due to anomalous driving behavior are provided.

In accordance with some embodiments, a computer implemented method is provided. The method comprises receiving, by a corrective assistance circuit in a vehicle, first data corresponding to a current operational state of the vehicle while performing a controllable drift. The method also comprises receiving, by the corrective assistance circuit, a request to operate the vehicle in a requested operational state and determining, by the corrective assistance circuit, that the requested operational state exceeds a threshold operational state associated with an uncontrollable drift. Further, the method comprises, in response to the determination, providing, by the corrective assistance circuit, corrective assistance to operate the vehicle in a corrective operational state to prevent the vehicle from entering an uncontrollable drift.

In another aspect, a vehicle is provided that comprises a memory storing instructions and one or more processors communicably coupled to the memory. The one or more processors are configured to execute the instructions to receive first data corresponding to a current operational state of the vehicle while performing a controllable drift, receive a request to operate the vehicle in a requested operational state, and determine that the requested operational state exceeds a threshold operational state associated with an uncontrollable drift. Further, the one or more processors are configured to execute the instructions to, in response to the determination, provide corrective assistance to operate the vehicle in an corrective operational state to prevent the vehicle from entering an uncontrollable drift.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
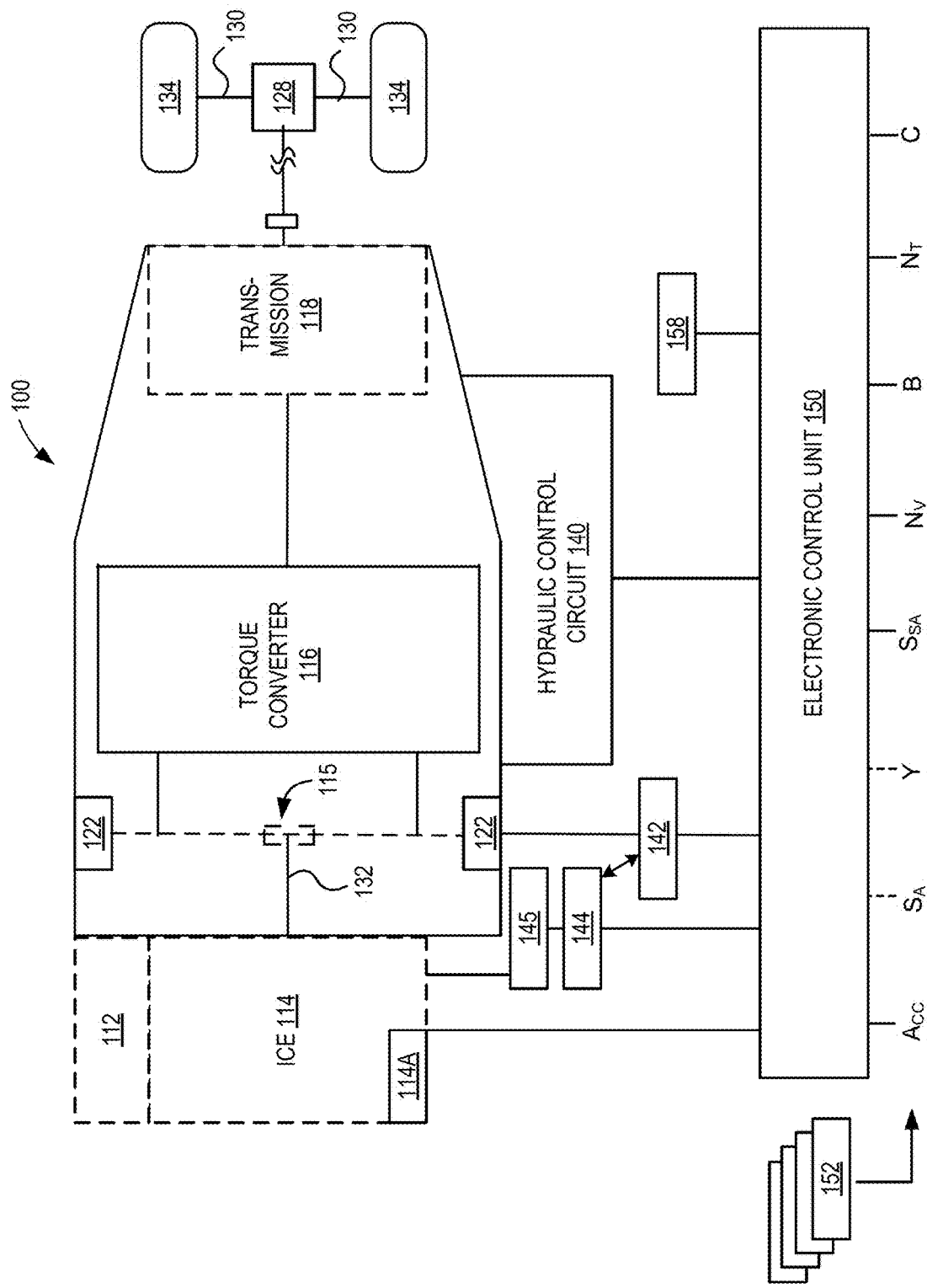
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Drifting/sliding/slipping occurs when the rear tires of a vehicle lose traction with the road surface. As alluded to above, there is a limit to the amount of lateral frictional force a vehicle's tires can exert on a road surface. Past this peak force limit, the tires will saturate (e.g., lose traction with the road), and begin to slide/slip. Drifting has a reputation for being dangerous because both human drivers and autonomous control technologies have trouble managing the dual objectives of path tracking (e.g., controlling where the vehicle is going), and restoring stability (e.g., restoring traction between the tires and the road, and/or stopping the vehicle from spinning out of control) while drifting. For this reason, most automated/assisted driving technologies look primarily at the grip driving range and try to limit the vehicle's performance so that the tires will always be below their peak force capability. By limiting the vehicle's performance in this way, the vehicle will stay within the grip driving range and autonomous control algorithms that work in that range can be applied.

However, in certain situations, a driver may want to drift. For example, many professional or rally car drivers intentionally cause a vehicle to drift in order to navigate sharp turns at peak efficiency. While drifting, the vehicle will often point in a different direction than it is moving. Put another way, the racer operates the vehicle at a high sideslip angle (e.g., the angle between the direction the vehicle is pointing, and the vehicle's linear velocity vector). In this way, the driver is able to navigate the turn faster than would be possible in the grip driving range.

Experienced drivers are able to control/manipulate the drift condition of the vehicle in a number of ways. For example, racers may use a counter-steering technique (e.g., rotating the steering wheel counter to the desired direction of a turn, for example, steering left to turn right), in order to increase the aggressiveness of a drift. Racers may also perform clutch kicks (e.g., a depression and sudden release of the clutch pedal which jolts the driveline of the vehicle) in order to increase the aggressiveness of mild drifts, and/or initiate drifts. More generally, racers are able to manipulate the throttle, steering, brakes, and clutch of a vehicle in order to control it during a drift.

Outside the professional racing context, drift driving/ learning to drift drive can be a fun activity which enhances the driver experience. However, as alluded to above, controlling a drifting vehicle can be difficult for inexperienced drivers. Initiating a drift can be even more difficult (and dangerous). For this reason, an automated/assisted driving system which facilitates an interactive drift driving experience for the driver, while maintaining a safe/controllable drift, is highly desirable.

Accordingly, embodiments of the technology disclosed herein are directed towards systems and methods of using an autonomous/assisted driving system to maintain controlled vehicle operation while performing aggressive driving maneuvers. Various embodiments disclosed herein provided for an autonomous/assisted driving system that can provide corrective assistance in order to maintain a stable controllable drift (e.g. the range of operating conditions where a vehicle is both drifting, and controllable), while permitting a drift driving experience for the driver.

In various embodiments, an autonomous/assisted driving system can aid a driver in controlling a drifting maneuver. In these embodiments, the driver is able to use steering, throttle, clutch, and brakes in order to control the vehicle into and during the drift maneuver. In these embodiments, the autonomous/assisted driving system operates to detect an attempt to operate the vehicle under an uncontrollable drift condition (e.g., the vehicle is drifting but not controllable) and provide corrective assistance responsive to the attempt. Put another way, in response to manual control operations performed by the driver, the automated/assisted driving system can function to provide corrective assistance in order to prevent the vehicle from entering an uncontrollable drift.

In an illustrative embodiment, the autonomous/assisted driving system operates to provide corrective throttle assistance when the driver attempts to enter an uncontrollable drift condition through increased throttle operation amount. For example, a driver may input a throttle command (e.g., through input on an accelerator pedal) that could result in an uncontrollable drift condition. The autonomous/assisted driving system can operate to determine an threshold wheelspeed for a controllable drift maneuver (e.g., a maximum allowable wheelspeed before transitioning to an uncontrollable drift) and an requested wheelspeed from a requested vehicle state (e.g., requested increase in throttle operation amount). The autonomous/assisted driving system can determine whether the requested wheelspeed may result in an uncontrollable drift, and, if so, provide corrective assistance to the throttle operation amount in order to prevent the vehicle from entering an uncontrollable drift and continue with a controllable drifting maneuver.

It should be understood that while a few autonomous control technologies consider controlling a vehicle while drifting, most that do merely focus on controlling a vehicle after it has started drifting, and look to control the vehicle back to grip driving as fast as possible. Among the select few autonomous control technologies which contemplate an intentional transition from grip driving to drift driving, none utilize threshold wheelspeeds of a controllable drift compared to a requested wheelspeed to trigger corrective assistance. Rather, conventional/existing autonomous control technologies are premised on open-loop stable control for drift driving. However, as an angle of slip increases during a drift maneuver, the tire begins to saturate (e.g., the increase of force per increase in slip angle tapers off, up until a maximum value of force). Past this, a tire curve either flattens out, or takes on a negative slope. Because of this nonlinear behavior, when the rear tires operate at large slip angles, due to high values of vehicle sideslip or body rotational rate, the tires no longer naturally provide restoring forces. Thus, the vehicle becomes open-loop unstable, and the open-loop stable approaches of the conventional/existing autonomous control technologies fail to account for the open-loop unstable conditions. Accordingly, open-loop stable control technologies are less robust to handling conditions in which the drift conditions approach uncontrollable drift conditions, which rest well into open-loop unstable.

While embodiments disclosed herein are described with reference to drifting maneuvers, the present disclosure is not limited to only drifting maneuvers. The embodiments of the present technology are applicable to any aggressive or sporty driving techniques during which the tires of a vehicle are saturated, and are therefore undergoing slippage or sliding on a road surface.

The systems and methods for providing a corrective assistance in order to maintain a stable and safe drifting maneuver disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for providing a corrective assistance to maintain a stable and safe drifting maneuver disclosed herein, can be implemented in other types of vehicle including gasoline- or diesel-powered vehicles, fuel-cell vehicles, electric vehicles, or other vehicle.

FIG. 1 illustrates a drive system of an example vehicle 100 that may include an internal combustion engine 114 and one or more electric motors 122 (which may also serve as generators) as sources of motive power. Driving force generated by the internal combustion engine 114 and motors 122 can be transmitted to one or more wheels 134 via a torque converter 116, a transmission 118, a differential gear device 128, and a pair of axles 130.

As an HEV, vehicle 100 may be driven/powered with either or both of engine 114 and the motor(s) 122 as the drive source for travel. For example, a first travel mode may be an engine-only travel mode that only uses internal combustion engine 114 as the source of motive power. A second travel mode may be an EV travel mode that only uses the motor(s) 122 as the source of motive power. A third travel mode may be an HEV travel mode that uses engine 114 and the motor(s) 122 as the sources of motive power. In the engine-only and HEV travel modes, vehicle 100 relies on the motive force generated at least by internal combustion engine 114, and a clutch 115 may be included to engage engine 114. In the EV travel mode, vehicle 100 is powered by the motive force generated by motor 122 while engine 114 may be stopped and clutch 115 disengaged.

Internal combustion engine 114 can be an internal combustion engine such as a gasoline, diesel or similarly powered engine in which fuel is injected into and combusted in a combustion chamber. A cooling system 112 can be provided to cool the engine 114 such as, for example, by removing excess heat from engine 114. For example, cooling system 112 can be implemented to include a radiator, a water pump and a series of cooling channels. In operation, the water pump circulates coolant through the engine 114 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 114. In other applications, either or both the water pump and the fan may be operated by electric current such as from battery 144.

An output control circuit 114A may be provided to control drive (output torque) of engine 114. Output control circuit 114A may include a throttle actuator to control an electronic throttle valve that controls fuel injection, an ignition device that controls ignition timing, and the like. Output control circuit 114A may execute output control of engine 114 according to a command control signal(s) supplied from an electronic control unit 150, described below. Such output control can include, for example, throttle control, fuel injection control, and ignition timing control. Throttle commands from a driver of vehicle 100 may be communicated by wire to electronic control unit 150 via an accelerator pedal position sensor attached to the accelerator pedal (not pictured). The accelerator pedal position sensor may be one of sensors 152, described below.

Motor 122 can also be used to provide motive power in vehicle 100 and is powered electrically via a battery 144. Battery 144 may be implemented as one or more batteries or other power storage devices including, for example, lead-acid batteries, nickel-metal hydride batteries, lithium ion batteries, capacitive storage devices, and so on. Battery 144 may be charged by a battery charger 145 that receives energy from internal combustion engine 114. For example, an alternator or generator may be coupled directly or indirectly to a drive shaft of internal combustion engine 114 to generate an electrical current as a result of the operation of internal combustion engine 114. A clutch can be included to engage/disengage the battery charger 145. Battery 144 may also be charged by motor 122 such as, for example, by regenerative braking or by coasting during which time motor 122 operate as generator.

Motor 122 can be powered by battery 144 to generate a motive force to move the vehicle and adjust vehicle speed. Motor 122 can also function as a generator to generate electrical power such as, for example, when coasting or braking. Battery 144 may also be used to power other electrical or electronic systems in the vehicle. Motor 122 may be connected to battery 144 via an inverter 142. Battery 144 can include, for example, one or more batteries, capacitive storage units, or other storage reservoirs suitable for storing electrical energy that can be used to power motor 122. When battery 144 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 150 (described below) may be included and may control the electric drive components of the vehicle as well as other vehicle components. For example, electronic control unit 150 may control inverter 142, adjust driving current supplied to motor 122, and adjust the current received from motor 122 during regenerative coasting and breaking. As a more particular example, output torque of the motor 122 can be increased or decreased by electronic control unit 150 through the inverter 142.

A torque converter 116 can be included to control the application of power from engine 114 and motor 122 to transmission 118. Torque converter 116 can include a viscous fluid coupling that transfers rotational power from the motive power source to the driveshaft via the transmission. Torque converter 116 can include a conventional torque converter or a lockup torque converter. In other embodiments, a mechanical clutch can be used in place of torque converter 116.

Clutch 115 can be included to engage and disengage engine 114 from the drivetrain of the vehicle. In the illustrated example, a crankshaft 132, which is an output member of engine 114, may be selectively coupled to the motor 122 and torque converter 116 via clutch 115. Clutch 115 can be implemented as, for example, a multiple disc type hydraulic frictional engagement device whose engagement is controlled by an actuator such as a hydraulic actuator.

Clutch 115 may be controlled using a clutch-by-wire system. In this system, the engagement of the clutch may be controlled by a clutch actuator (not pictured). Electronic control unit 150 may control the clutch actuator. Clutch commands may be communicated from the driver of vehicle 100 to electronic control unit 150 via a clutch pedal position sensor positioned on the clutch pedal of vehicle 100. In some embodiments, this sensor may be one of sensors 152.

Clutch 115 may be controlled such that its engagement state is complete engagement, slip engagement, and complete disengagement complete disengagement, depending on the pressure applied to the clutch. For example, a torque capacity of clutch 115 may be controlled according to the hydraulic pressure supplied from a hydraulic control circuit 140. When clutch 115 is engaged, power transmission is provided in the power transmission path between the crankshaft 132 and torque converter 116. On the other hand, when clutch 115 is disengaged, motive power from engine 114 is not delivered to the torque converter 116. In a slip engagement state, clutch 115 is engaged, and motive power is provided to torque converter 116 according to a torque capacity (transmission torque) of the clutch 115.

Vehicle 100 may further include a brake-by-wire system (not pictured). In this system, a brake actuator may control the application of brakes to wheels 134. Electronic control unit 150 may control the brake actuator. Braking commands may be communicated from the driver of vehicle 100 to electronic control unit 150 via a brake pedal position sensor positioned on the brake pedal of vehicle 100. In some embodiments, vehicle 100 may also include a hand brake/parking brake which is connected by wire to electronic control unit 150 in a similar fashion.

Vehicle 100 may also include a steering-by-wire system (not pictured). In this system, a steering actuator may control the direction of wheels 134. Electronic control unit may control the steering actuator. Steering commands may be communicated from the driver of vehicle 100 to electronic control unit 150 via a steering angle sensor positioned on the steering wheel of vehicle 100.

As alluded to above, vehicle 100 may include an electronic control unit 150. Electronic control unit 150 may include circuitry to control various aspects of the vehicle operation. Electronic control unit 150 may include, for example, a microcomputer that includes a one or more processing units (e.g., microprocessors), memory storage (e.g., RAM, ROM, etc.), and I/O devices. The processing units of electronic control unit 150, execute instructions stored in memory to control one or more electrical systems or subsystems in the vehicle. As will be discussed in greater detail below, electric control unit 150 may be used to control vehicle 100 in order to maintain a controllable drift, and to effectuate a desired drift condition communicated by a driver of vehicle 100. Electronic control unit 150 can include a plurality of electronic control units such as, for example, an electronic engine control module, a powertrain control module, a transmission control module, a steering control module, a clutch control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 150 receives information from a plurality of sensors included in vehicle 100. For example, electronic control unit 150 may receive signals that indicate vehicle operating conditions or characteristics, or signals that can be used to derive vehicle operating conditions or characteristics. These may include, but are not limited to throttle/accelerator operation amount ($A_{CC}$), a steering angle ($S_A$) of the steering wheel, yaw rate of the vehicle, Y (e.g. the angular velocity of the vehicle around its yaw axis), sideslip angle of the vehicle ($S_{SA}$) (e.g. the angle between the direction the vehicle is pointing and the vehicle's translational velocity vector), and vehicle speed ($N_V$). These may also include torque converter 116 output ($N_T$) (e.g., output amps indicative of motor output), brake operation amount/pressure (B), and clutch operation amount/pressure (C). Accordingly, vehicle 100 can include a plurality of sensors 152 that can be used to detect various conditions internal or external to the vehicle and provide sensed conditions to engine control unit 150 (which, again, may be implemented as one or a plurality of individual control circuits). Accordingly, vehicle 100 can include a plurality of sensors 152 that can be used to detect various conditions internal or external to the vehicle and provide sensed conditions to engine control unit 150 (which, again, may be implemented as one or a plurality of individual control circuits).

In some embodiments, one or more of the sensors 152 may include their own processing capability to compute the results for additional information that can be provided to electronic control unit 150. In other embodiments, one or more sensors may be data-gathering-only sensors that provide only raw data to electronic control unit 150. In further embodiments, hybrid sensors may be included that provide a combination of raw data and processed data to electronic control unit 150. For example, while vehicle 100 is drifting, a clutch pedal position sensor may be able to interpret a quick depression and release of the clutch pedal (e.g., an attempt at a "clutch kick") as an indication that the driver of vehicle 100 wants to increase the aggressiveness of the drift. As another example, while vehicle 100 is drifting, an accelerator pedal position sensor may be able to interpret increased depression of the accelerator pedal (e.g., a request for increase throttle operation amount in an attempt by the driver to increase accelerator and vehicle speed, which can be achieved through increased wheelspeed) as an indication that the driver of vehicle 100 wants to increase the aggressiveness of the drift. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 100, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
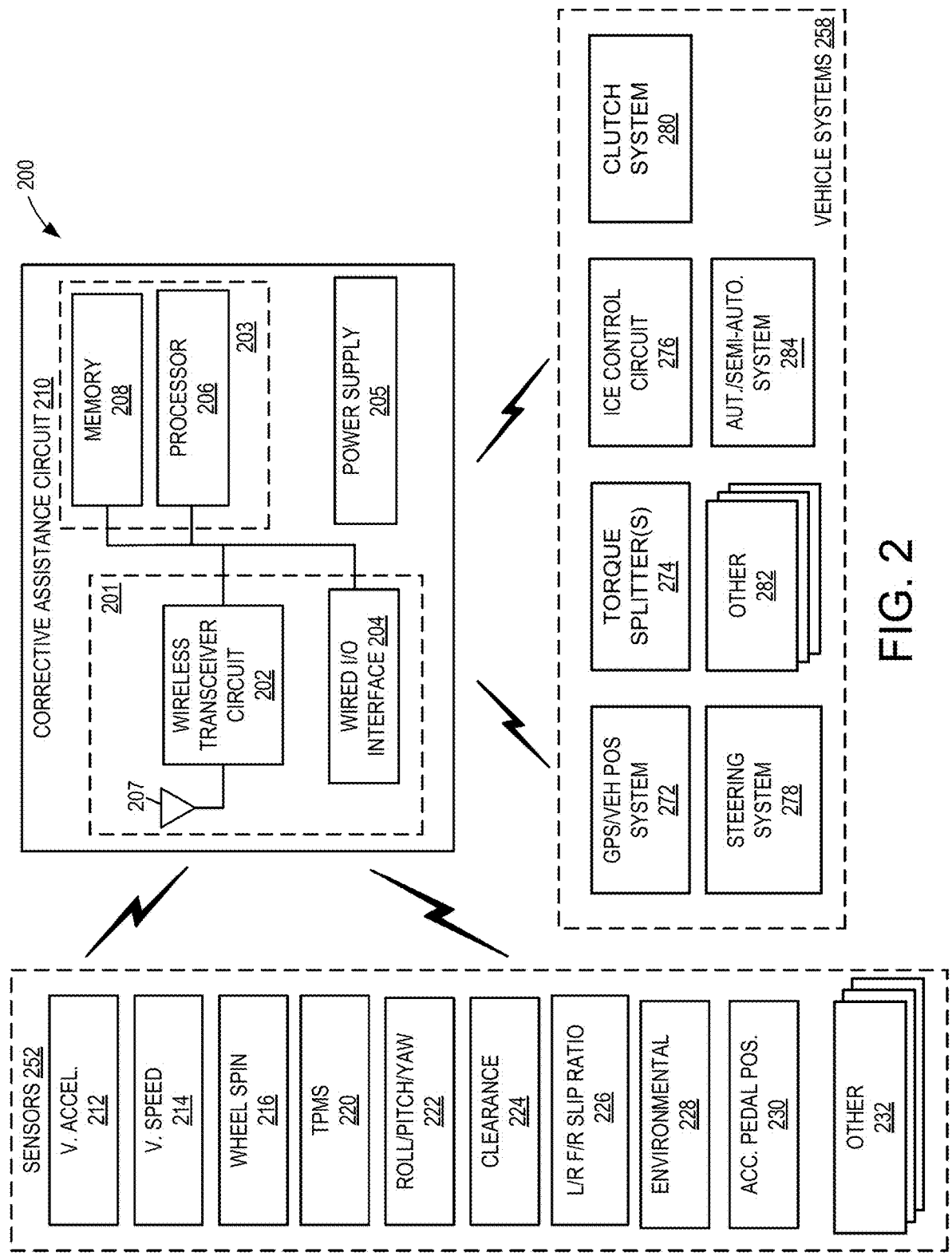
FIG. 2 illustrates an example architecture for control assistance system in accordance with one embodiment of the systems and methods described herein.

FIG. 2 illustrates an example architecture for providing corrective assistance while maintaining a controllable drifting maneuver in accordance with embodiments of the systems and methods described herein. Referring now to FIG. 2, in this example, corrective assistance system 200 includes a corrective assistance circuit 210, a plurality of sensors 252 and a plurality of vehicle systems 258. Sensors 252 (such as sensors 152 described in connection with FIG. 1) and vehicle systems 258 (such as subsystems 158 described in connection with FIG. 1) can communicate with corrective assistance circuit 210 via a wired or wireless communication interface. Although sensors 252 and vehicle systems 258 are depicted as communicating with corrective assistance circuit 210, they can also communicate with each other as well as with other vehicle systems. Corrective assistance circuit 210 can be implemented as an ECU or as part of an ECU such as, for example electronic control unit 150. In other embodiments, corrective assistance circuit 210 can be implemented independently of the ECU.

Corrective assistance circuit 210 in this example includes a communication circuit 201, a decision circuit 203 (including a processor 206 and memory 208 in this example) and a power supply 205. Components of corrective assistance circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as, one or more of the following elements: position data; vehicle speed data; risk and mitigation data, along with other data as needed. Memory 208 can be made up of one or more modules of one or more different types of memory, and may be configured to store data and other information as well as operational instructions that may be used by the processor 206 to corrective assistance circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a corrective assistance circuit 210.

Communication circuit 201 includes either or both a wireless transceiver circuit 202 with an associated antenna 207 and a wired I/O interface 204 with an associated hardwired data port (not illustrated). As this example illustrates, communications with corrective assistance circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 207 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by corrective assistance circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 205 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 152 such as those described above with reference to the example of FIG. 1. Sensors 252 can include additional sensors that may or not otherwise be included on a standard vehicle in which drift control system 200 is implemented. In the illustrated example, sensors 252 include vehicle acceleration sensors 212, vehicle speed sensors 214, wheelspin/wheelspeed sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, environmental sensors 228 (e.g., to detect salinity or other environmental conditions), and throttle engagement sensors (i.e. accelerator pedal position) 230. Additional sensors 232 can also be included as may be appropriate for a given implementation of autonomous control system 200. For example, additional sensors 232 may include sensors for brake engagement, clutch engagement, and steering wheel position. There may also be additional sensors for detecting and/or computing sideslip velocities, sideslip angles, percent sideslip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle tires and roadway, distance from center of gravity of the vehicle to front axle, distance from center of gravity of vehicle to rear axle, total mass of the vehicle, total longitudinal force, rear longitudinal force, front longitudinal force, total lateral force, rear lateral force, front lateral force, longitudinal speed, lateral speed, longitudinal acceleration, time derivatives of steering wheel position, time derivatives of throttle, gear, exhaust, revolutions per minutes, mileage, emissions, and/or other operational parameters (also referred to herein as states) of the vehicle. Additional sensors 232 can also be included as may be appropriate for a given implementation of corrective assistance system 200.

Vehicle systems 258, for example, systems and subsystems 158 described above with reference to the example of FIG. 1, can include any of a number of different vehicle components or subsystems used to control or monitor various aspects of the vehicle and its performance. In this example, the vehicle systems 258 include a GPS or other vehicle positioning system 272; torque splitters 274 that can control distribution of power among the vehicle wheels such as, for example, by controlling front/rear and left/right torque split; engine control circuits 276 to control the operation of engine (e.g. internal combustion engine 114); steering systems 278 to turn the wheels of vehicle 100; clutch system 280; autonomous or semi-autonomous driving systems 284, such as forward/rear collision detection and warning systems, pedestrian detection systems, autonomous or semi-autonomous driving systems, and the like; and other vehicle systems 282, such as, for example, an adjustable-height air suspension system, Advanced Driver-Assistance Systems (ADAS).

During operation, corrective assistance circuit 210 can receive information from various vehicle sensors which may be used to interpret a desired drift condition communicated by a driver of the vehicle. Communication circuit 201 can be used to transmit and receive information between corrective assistance circuit 210 and sensors 252, and corrective assistance circuit 210 and vehicle systems 258. Also, sensors 252 may communicate with vehicle systems 258 directly or indirectly (e.g., via communication circuit 201 or otherwise).

In various embodiments, communication circuit 201 can be configured to receive data and other information from sensors 252 used to interpret a desired drift condition communicated by a driver of the vehicle. Additionally, communication circuit 201 can be used to send an activation signal or other activation information to various vehicle systems 258 as part of effectuating the desired drift condition and/or maintain a controllable drift condition. For example, as described in more detail below, communication circuit 201 can be used to receive inputs from a driver of the vehicle and send signals to, for example, one or more of: torque splitters 274 to control front/rear torque split and left/right torque split; ICE control circuit 276 to, for example, control throttle, motor torque, motor speed of the various motors in the system; steering system 278 to, for example, increase the slip angle of the tires; and clutch system 280 to execute a drift maneuver. In another example, as described in more detail below, communication circuit 201 can be used to send signals to, for example, one or more of: torque splitters 274 to control front/rear torque split and left/right torque split; ICE control circuit 276 to, for example, control throttle, motor torque, motor speed of the various motors in the system; steering system 278 to, for example, increase the slip angle of the tires; and clutch system 280 to provide corrective assistance that continues the drift maneuver while ensure that the drift is stable. The decision regarding what action to take via these various vehicle systems 258 can be made based on the information detected by sensors 252. Examples of this are described in more detail below.

Figure 3:
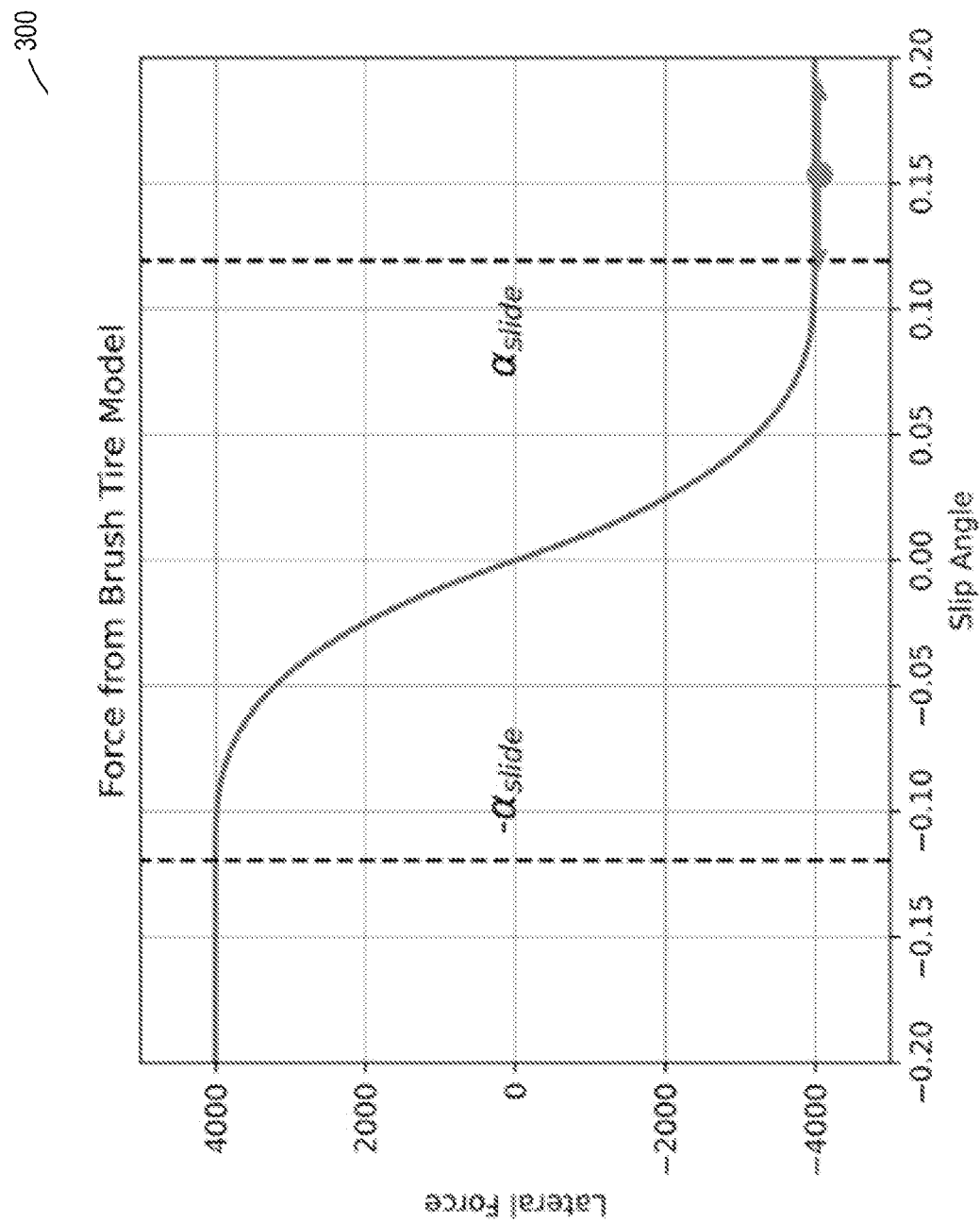
FIG. 3 is a graph illustrating an example relationship between the lateral force experienced by a vehicle's tires during driving, and a slip angle of the tires.

FIG. 3 is a graph illustrating an example relationship between the lateral force (or cornering force) experienced by a vehicle's tires (such as a rear tire in this example) during driving, and a slip angle of the tires. Similar to the sideslip angle of a vehicle, the slip angle of a tire is the angle between the tire's linear velocity vector (e.g., the linear velocity of the vehicle travel) and the direction in which the tire is pointing. As the graph in FIG. 3 illustrates, within a certain range of slip angles (e.g., between $-\alpha_{slide}$ and $\alpha_{slide}$), as the magnitude of slip angle increases, the magnitude of lateral frictional force between the tires and the road increases as well. For example, as a vehicle negotiates a tight turn, the slip angle of its tires will increase, as will the lateral frictional force between its tires and the road surface. Of note, as FIG. 3 illustrates, there is a peak lateral force that a vehicle's tires can achieve before they begin to "slip." This is known as the tire's saturation point. Put another way, at $\alpha=|\alpha_{slide}|$, the cornering/lateral force saturates, and the tires lose traction with the road surface. For this reason, drift driving is often associated with high tire slip angles (as well as vehicle high sideslip angles), and cornering forces which exceed a vehicle's tire's peak lateral force limit (e.g., when the cornering forces saturate the vehicle's tire's peak lateral force limit). In various implementations, drift driving is often associated with high rear tire slip angles and saturating the rear tires of a vehicle.

Figure 4:
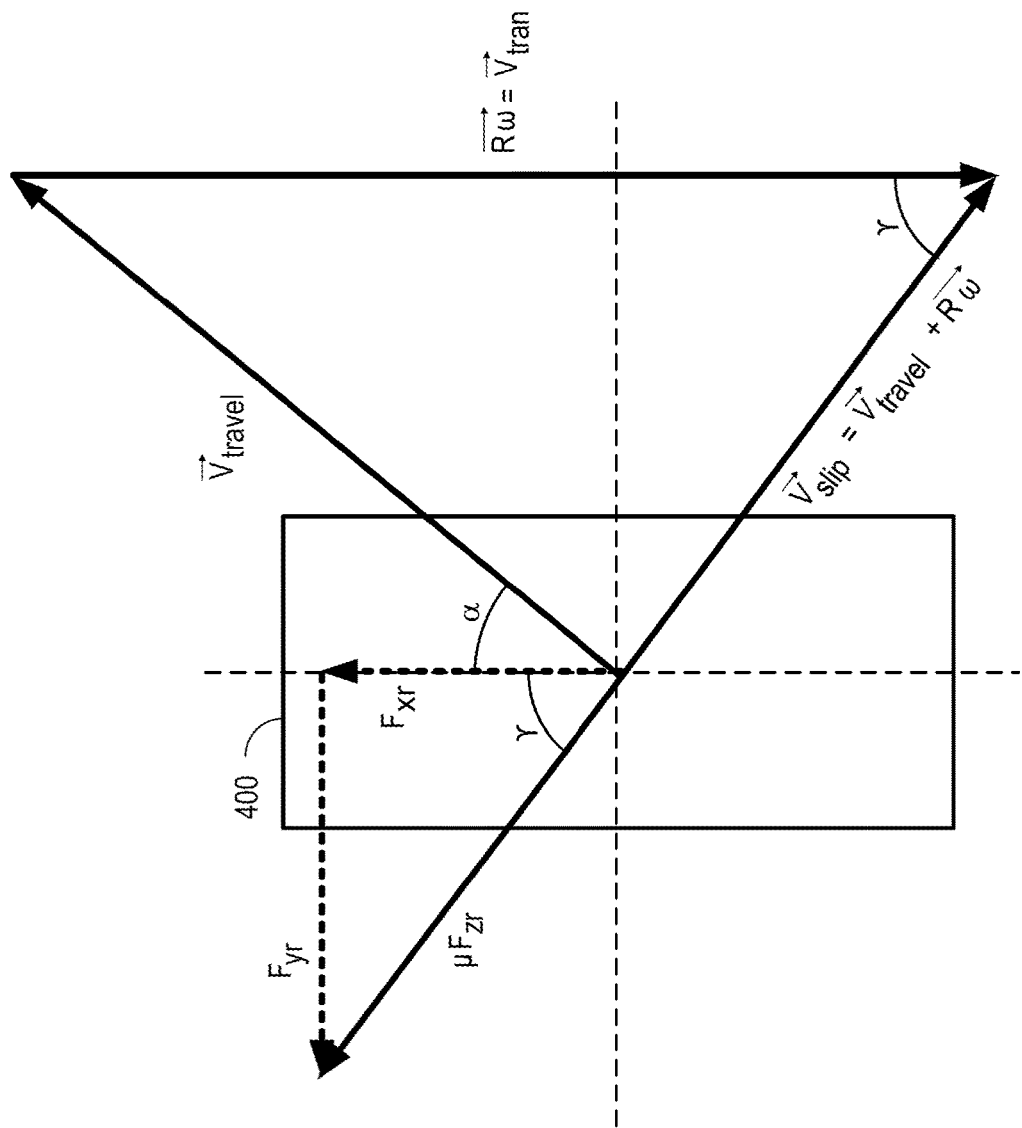
FIG. 4 is a diagram illustrating velocity and force vectors for an example vehicle during a slip.

FIG. 4 is a diagram illustrating velocity and force vectors for an example vehicle during a slip. FIG. 4 depicts velocity and force vectors for a portion of a tire that physically contacts a road surface, referred to as a contact patch 400 of a tire. As the tire rotates with an rotational velocity ($\omega$), a translational velocity ($\vec{V}_{Tran}$) of the tire is provided as the product of the rotational velocity and radius of the tire (R). As a result of frictional forces between the contact patch 400 and the road surface, the translational velocity of the tire generates a translational friction force. The total translational force ($\mu F_{zr}$) can be decomposed into a lateral friction force ($F_{yr}$) and a longitudinal friction force ($F_{xr}$). The angle between total translational force ($\mu F_{zr}$) and a longitudinal friction force ($F_{xr}$) is denoted as a force angle ($\gamma$). The magnitude of the total translational force ($\mu F_{zr}$) is the maximum available force from friction.

As discussed earlier, there is a peak lateral frictional force, the saturation point, that a vehicle's tires can achieve before the tire begins to "slip." When the tire reaches this saturation point, the contact patch 400 begins to slip or slide. The velocity of the slippage is shown as slip velocity vector ($\vec{V}_{slip}$), which can be decomposed into the linear velocity vector in the direction of travel ($\vec{V}_{travel}$) and the translational velocity ($\vec{V}_{Tran}$) of the tire. The angle between the translational velocity ($\vec{V}_{Tran}$) of the tire and the slip velocity vector ($\vec{V}_{slip}$) is equal to the angle ($\gamma$). Because the entire contact patch 400 is sliding above the saturation point, the direction of the total translational force ($\mu F_{zr}$) opposes that of the slip velocity vector ($\vec{V}_{slip}$).

At this point, regardless of increases in rotational velocity ($\omega$), no additional magnitude in the total translational force ($\mu F_{zr}$) can be provided due to the slippage between the contact patch 400 and the road surface. However, the distribution between lateral friction force ($F_{yr}$) and a longitudinal friction force ($F_{xr}$) can be controlled through a control of relative slip that changes the angle ($\gamma$). That is, an increase in rotational velocity ($\omega$) in the tire (e.g., an increase in wheel speed or spinning of the tire) results in an increase in the longitudinal friction force ($F_{xr}$) and a decrease in lateral friction force ($F_{yr}$). This decrease in lateral friction force ($F_{yr}$) can create oversteer.

Controlling the lateral/longitudinal force distribution can be leveraged to provide sporty driving phenomena like power sliding and drifting. As shown in FIG. 3, control of the lateral/longitudinal force distribution corresponds to controlling the magnitude (or length) of the translational velocity ($\vec{V}_{Tran}$) though adjustment of the rotational velocity ($\omega$). Since the tire is saturated, traveling direction linear velocity vector ($\vec{V}_{travel}$) is not changed, resulting in a change in the slip velocity ($\vec{V}_{slip}$) to maintain the traveling direction linear velocity vector ($\vec{V}_{travel}$). As a result, the angle ($\gamma$) changes, which causes changes to the longitudinal friction force ($F_{xr}$) and lateral friction force ($F_{yr}$) so to maintain the magnitude of the total translational force ($\mu F_{zr}$). However, if the translational velocity ($\vec{V}_{Tran}$) is increased beyond an stability threshold, the force angle ($\gamma$) would become too small resulting in an uncontrollable drift condition that could lead to an oversteering or spinning out of the vehicle.

Embodiments disclosed herein provide for corrective assistance by controlling rotational velocity ($\omega$) such that the force angle ($\gamma$) is within an allowable range over which a controllable drift maneuver can be performed (e.g., a controllable drift driving range). The allowable range can be set between the tire's saturation point and a boundary at which the drift would be unstable. In an illustrative embodiment, the allowable range can be based on a Maximum Phase Recovery Envelope having boundaries defined between the tire's saturation point and a point at which drifting conditions become unstable and unsafe (e.g., the vehicle may be unable to recover and loss of control is unavoidable). Examples of a Maximum Phase Recovery Envelope is described in Goh, J., Gerdes, J. C., Bobier-Tiu, C., Pavone, M., Rock, S. M., & Stanford University, (2019), Automated vehicle control beyond the stability limits, the disclosure of which is incorporated herein by reference in its entirety.

Embodiments disclosed herein can be used to the limit magnitude of slip velocity vector ($\vec{V}_{slip}$) to a small number, thereby allowing a maximum longitudinal friction force ($F_{xr}$) without decreasing lateral friction force ($F_{yr}$) such that the vehicle does not become unstable and uncontrollable. Allowing an amount of longitudinal slip could allow for some sportiness, the effect of the slip on the dynamics of the car changes with changes in vehicle states (as described below). Accordingly, embodiments disclosed herein provide for converting a threshold amount of allowable slip to a threshold force angle ($\gamma$). This is possible because a reduction in lateral friction force ($F_{yr}$) is what a driver directly feels on the car during a drift driving. A relatively high reduction in lateral friction force ($F_{yr}$) causes the vehicle to spin quickly (e.g., a high yaw rate), which can be difficult to recover from. A small reduction in lateral friction force ($F_{yr}$) allows the vehicle to spin at a slower rate (e.g., slower yaw rate) and be easier to control while still allowing an allowable drift angles or slip angles ($\alpha$). As a result, higher slip velocity vector ($\vec{V}_{slip}$) is possible when the car is at or below a threshold force angle ($\gamma$) and the yaw rate appropriately, thereby allowing for a sustained and controllable drift.

Figure 5:
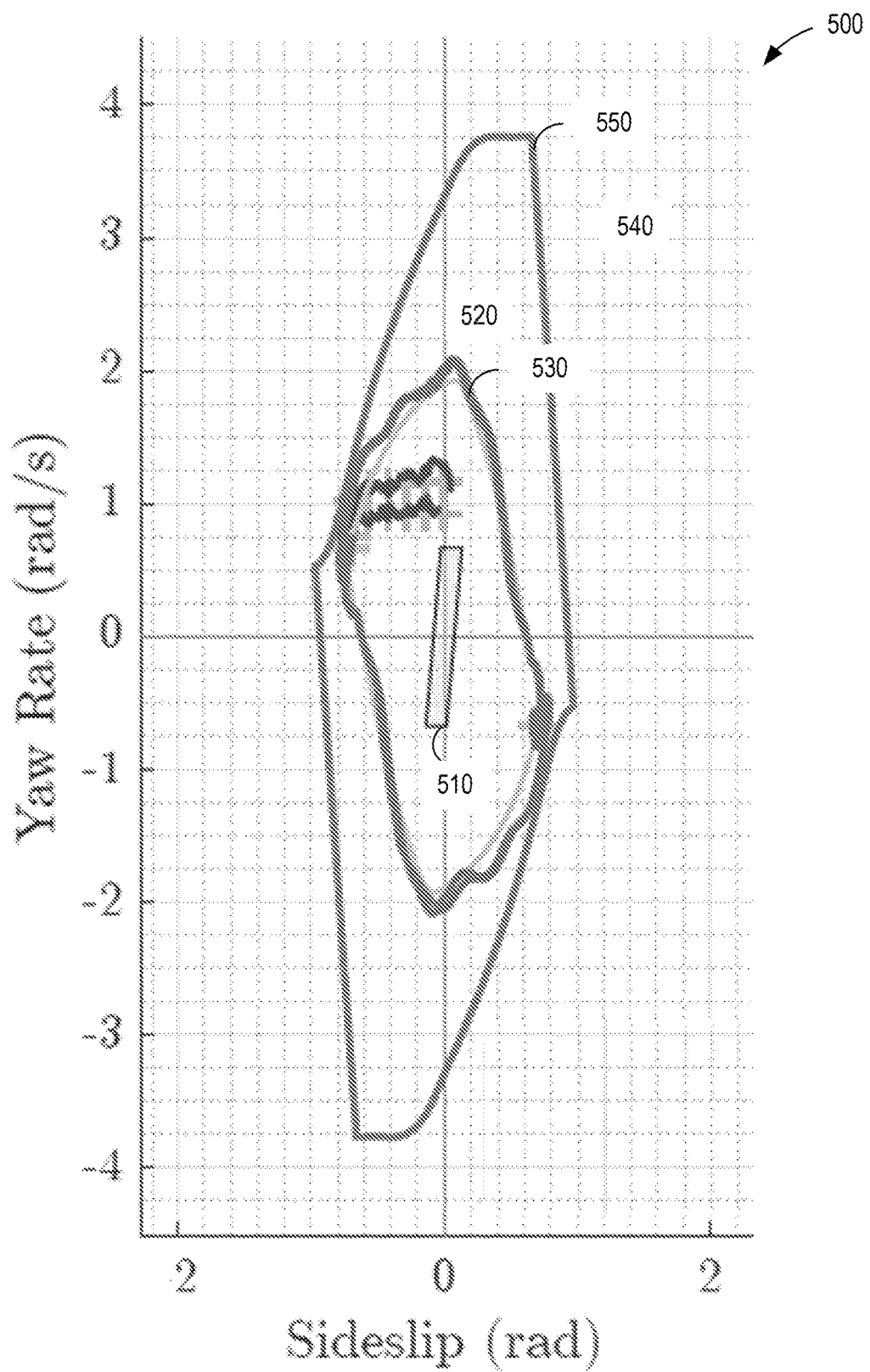
FIG. 5 is a graph illustrating an example phase portrait of a vehicle state space.

FIG. 5 is a graph illustrating an example phase portrait of a vehicle state space. A vehicle state space may be a graph or matrix which represents operation states of the vehicle. In the illustrated example, the vehicle state space 500 is two-dimensional (e.g., two states are shown): the y-axis plots yaw rate (rad/s), and the x-axis plots sideslip angle (rad). However, in other embodiments the vehicle state space may be n-dimensional, where each dimension represents a different operational state for the vehicle (e.g. vehicle speed, vehicle acceleration, yaw rate, sideslip velocities, sideslip angles, percent sideslip, frictional forces, degree of steer, heading, trajectory, front slip angle corresponding to full tire saturation, rear slip angle corresponding to full tire saturation, maximum stable steering angle given speed/friction, gravitational constant, coefficient of friction between tires and roadway, distance from center of gravity of the vehicle to its front axle, distance from center of gravity of the vehicle to its rear axle, total mass of the vehicle, total longitudinal force, rear longitudinal force, front longitudinal force, total lateral force, rear lateral force, front lateral force, longitudinal speed, lateral speed, longitudinal acceleration, steering angle, throttle engagement, brake engagement, clutch engagement, mileage, emissions, and/or other operational states of the vehicle).

Grip driving region 510 represents the region in vehicle state space 500 where a vehicle operates in the grip driving range. In the illustrated example, grip driving region 510 is a two-dimensional area, with sideslip angle and yaw rate as states. However, like vehicle state space 500, grip driving region 510 may be n dimensional.

As alluded to above, the grip driving range is the set of operating conditions where a vehicle's tires maintain traction with the road's surface. Put another way, the grip driving range is the set of operating conditions where a vehicle's tires can produce force up to and including their peak frictional force (e.g., tire's saturation point). In the illustrated example, a vehicle's operating conditions are defined by yaw rate and sideslip angle. Accordingly, if a vehicle's yaw rate and sideslip angle pair lie within grip driving region 510, that indicates that the vehicle is operating in the grip driving range (e.g., the vehicle's tires maintain traction with the road surface). For example, if a vehicle has a yaw rate of 0 rad/s, and a sideslip angle of 0 rad (e.g., driving in a straight line), that indicates that it is operating in the grip driving range.

Controllable drift driving region 520 represents a controllable drift driving region of vehicle state space 500 where a vehicle is in a controllable drift (e.g., controllable by steering, braking, and/or throttle executed by manual operation by a drive and/or autonomous operation by automatic braking, vehicle stability control, and traction control systems of a vehicle). In the illustrated example, controllable drift driving region 520 is a two-dimensional area, with sideslip angle and yaw rate as vehicle states. However, like vehicle state space 500, controllable drift driving region 520 may be n dimensional. In some embodiments, controllable drift region 520 may be derived using expert driving data. In other embodiments, controllable drift region 520 may be derived from learned information. In some embodiments, controllable drift region 520 may be stored in memory 208.

As alluded to earlier, the controllable drift driving range is the set of operating conditions where a vehicle's tires have broken traction with the road's surface. Put another way, the drift driving range is the set of operating conditions where a vehicle's tires are beyond their critical slip angle, such as peak frictional force limit (e.g., the vehicle is operating beyond the tire's saturation point). In the illustrated example, a vehicle's operating conditions are defined by yaw rate and sideslip angle. Accordingly, if a vehicle's yaw rate and sideslip angle pair (e.g., a vehicle state defined by the pair) lie within controllable drift driving region 520, that indicates that the vehicle is operating in the drift driving range. For example, if a vehicle has a yaw rate of 1.5 rad/s, and a sideslip angle of 0 rad, its yaw rate/sideslip pair lies inside controllable drift driving region 520, indicating that it is operating in the drift driving range.

The boundary between grip driving region 510 and controllable drift driving region 520 represents the set of operating conditions where a vehicle transitions from grip driving to drift driving, or vice versa. As will be discussed below, an understanding of the boundary between the grip driving region and the drift driving region can be instructive for control operations such as drift initiation (e.g., transitioning a vehicle from grip driving to drift driving).

Uncontrollable drift driving region 540 represents the unstable driving region of vehicle state space 500 where a vehicle is in an uncontrollable drift, from which the vehicle may be unable to recover. In the illustrated example, uncontrollable drift driving region 540 is a two-dimensional area, with sideslip angle and yaw rate as vehicle states. However, like controllable drift driving region 520, uncontrollable drifting region 540 may be n dimensional.

As alluded to earlier, the uncontrollable drift driving region is the set of operating conditions where a vehicle's tires have broken traction with the road's surface and the operating conditions of the vehicle are such that the vehicle may not be able to recover from slippage to safely operate the vehicle. Put another way, the drift driving region is the set of operating conditions where a vehicle's tires are beyond their critical slip angle, such as peak frictional force limit (e.g., the vehicle is operating beyond the tire's saturation point) and the vehicle is operating under an unstable condition that can lead to a loss of control. In the illustrated example, a vehicle's operating conditions are defined by yaw rate and sideslip angle. Accordingly, if a vehicle's yaw rate and sideslip angle pair (e.g., a vehicle state defined by the pair) lie in uncontrollable drift driving region 540, that indicates that the vehicle is operating in the uncontrollable drifting region. For example, if a vehicle has a yaw rate of 2.5 rad/s, and a sideslip angle of 2 rad, its yaw rate/sideslip pair lies in the uncontrollable drift driving region 540, indicating that it is operating in the drift driving range.

A stability boundary 550 between controllable drift driving region 520 and uncontrollable drift driving region 540 represents the set of operating conditions where a vehicle transitions from controllable drift driving to uncontrollable drift driving. Thus stability boundary 550 demarcates operating conditions in the vehicle is able to perform controllable drift driving from those that result in uncontrollable drift driving. Upon transitioning to the uncontrollable drift driving region 540, the vehicle may not be able to recover (e.g., transition back into the controllable drift driving region 520)

regardless of how the operating conditions of the vehicle are changed. This stability boundary 550 is an example of a Maximum Phase Recovery Envelope. As will be discussed below, an understanding of the stability boundary 550 between the drift driving region and the uncontrollable drifting region can be instructive for control operations such as corrective assistance for a maintain a stable, safe drift maneuver (e.g., controlling vehicle conditions so to refrain from transitioning a vehicle in the uncontrollable drift driving region). In some embodiments, stability boundary 550 may be derived using expert driving data. In other embodiments, stability boundary 550 may be derived from learned information. In some embodiments, stability boundary 550 may be stored in memory 208, and used as a stability threshold.

Phase portrait 530 represents example data from a vehicle while driving. More specifically, phase portrait 530 plots the yaw rate and sideslip angle of the vehicle as it navigates around a test course. As can be seen in the figure, at times the vehicle operated so to approach the stability boundary 550, but primarily the vehicle is navigated within the driving drifting region.

A vehicle state (also referred to herein as an operational state of the vehicle) is a data set associated with the contemporaneous operation of a vehicle. In an illustrated example, a vehicle state is comprised of two states (i.e. sideslip angle and yaw rate in the case of the vehicle state space 500). However, in other embodiments vehicle state 440 may be comprised of n states. In some embodiments, corrective assistance circuit 210 may obtain a vehicle state (e.g., vehicle state data) from sensors 252, GPS/VEH Position System 272, or other vehicle systems 258.

Figure 6:
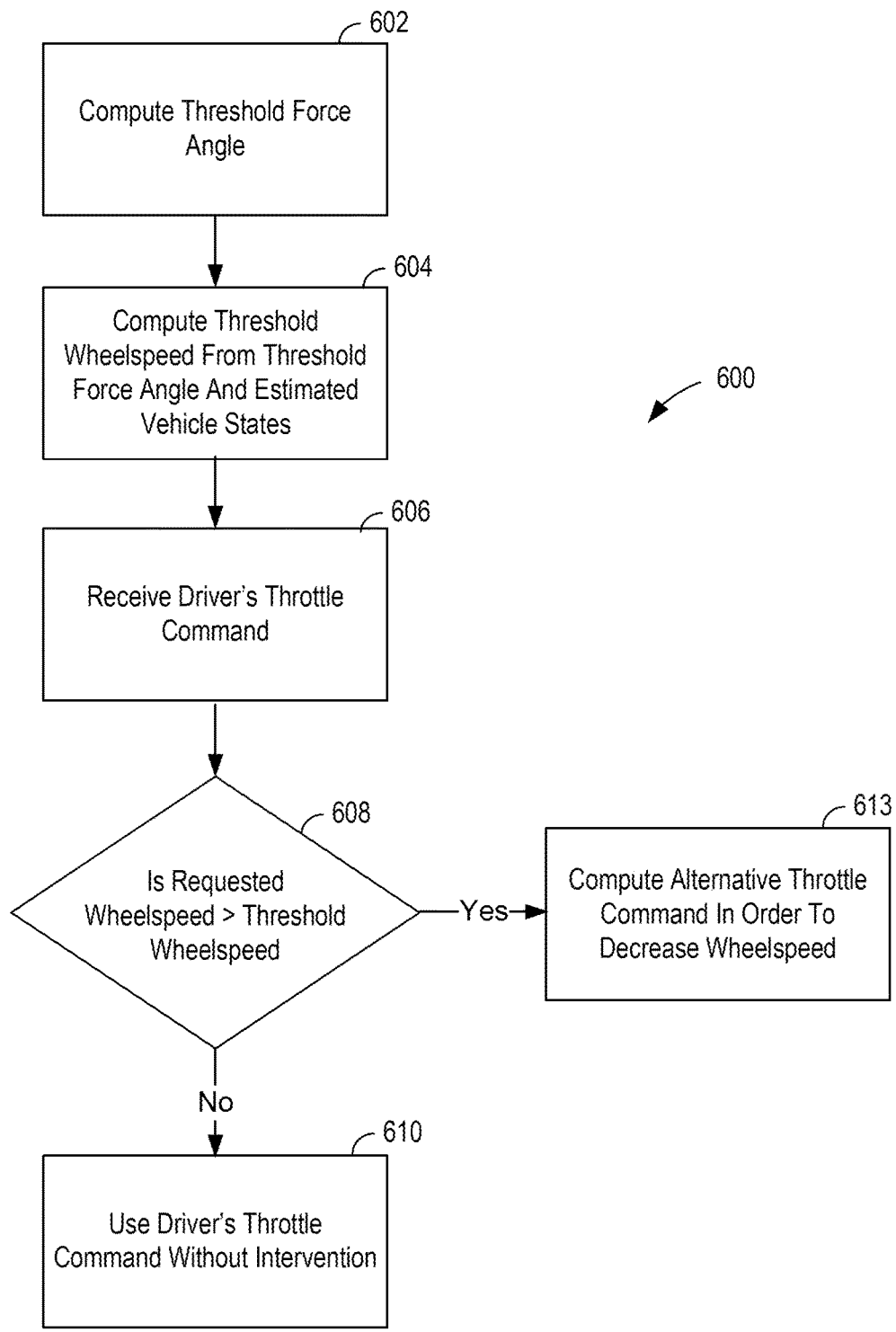
FIG. 6 is a flow chart illustrating example operations for providing corrective assistance to during a drifting maneuver in accordance with various embodiments disclosed herein.

FIG. 6 is a flow chart illustrating example operations for providing corrective assistance to during a drifting maneuver in accordance with various embodiments disclosed herein. FIG. 6 provides a process 600 that can be executed to maintain stable and safe performance of a drift maneuver, whether initiated by a driver or autonomously. Process 600 may be implemented as instructions, for example, stored on memory 208, that when executed by processor 206 perform one or more operations of process 600.

At operation 602, a threshold force angle ($\gamma$) is computed. In some embodiments, the threshold force angle ($\gamma$) can be determined from vehicle settings that set a maximum allowable drift angle or slip angle ($\alpha$). The maximum allowable drift angle ($\alpha$) can be extracted from the Maximum Phase Recovery Envelope. That is, vehicle states that define the Maximum Phase Recovery Envelope (e.g., stability boundary 550 of FIG. 5) can be used to derive maximum allowable drift angles ($\alpha$) for each vehicle state. For example, the Maximum Phase Recovery Envelope can be used to learn a mapping data set for vehicles states, such as force angle ($\gamma$), that do not transition the vehicle over the stability boundary 550 of the Maximum Phase Recovery Envelope. From the maximum allowable drift angles, a threshold allowable force angle ($\gamma$) can be determined, for each maximum allowable drift angle, from the trigonometric relationships shown in FIG. 4. In some embodiments, threshold allowable force angles ($\gamma$) are can be stored in memory, such as memory 208.

A controllable drift can be initiated, either before operation 602, in parallel with operation 602, or after operation 602. In some embodiments, operation 602 may be executed in advance of initiating a drift, so that threshold allowable force angles ($\gamma$) are readily available. In some embodiments, the controllable drift may be initiated by a driver who is manually controlling the vehicle. In other embodiments, the controllable drift may be initiated by an autonomous/assisted driving system (e.g. a driver may press a "drift initiation button" which instructs an autonomous/assisted driving system to initiate a controllable drift). In these embodiments, the autonomous/assisted driving system may utilize a closed-loop control system in order to initiate the drift. A closed-loop control system (a.k.a. a feedback control system) is a type of control system in which the controlling action depends, in part, on the generated output of the system. More specifically, in a closed-loop control system, part of the generated output, (i.e. the feedback signal; which may be the output signal itself, or some function of the output), is returned to the reference input via a feedback loop. In this way, the generated output of the system is compared to the desired output/reference input. For example, a closed-loop system may generate an error signal, which is the difference between the reference input signal and the feedback signal. This error signal is fed to the system controller, which converts it into a control signal designed to reduce the error, thus driving the generated output of the system towards the desired output.

In some embodiments, a closed-loop, autonomous/assisted driving system may use control laws involving sideslip, wheel speed, yaw rate, and other vehicle operation states in order to keep the vehicle controllable while initiating the drift. In certain embodiments, the system may use non-linear control theory. In other embodiments, the system may use Model Predictive Control (MPC). In some embodiments, the system may be implemented using a closed-loop controller, such as corrective assistance circuit 210. In some embodiments, corrective assistance circuit 210 may send control signals to two or more actuators of the vehicle in order to initiate the controllable drift. For example, corrective assistance circuit 210 may send control signals to the throttle, steering, brake and clutch actuators of the vehicle in order to initiate the controllable drift.

After a controllable drift has been initiated, at operation 604, a threshold wheelspeed is determined from the threshold allowable force angles ($\gamma$) and current estimated vehicle states. For example, vehicle state data can be obtained from sensors 252 and/or vehicle systems 258, which can be used to estimate current vehicle states. The estimated vehicle states can include operating conditions, such as, slip angle ($\alpha$), vehicle speed, vehicle heading trajectory, wheel slip, wheel spin and the like. From the estimated vehicle states a translational velocity vector ($\vec{V}_{Tran}$) can be derived from a vehicle speed as a magnitude and vehicle heading trajectory as a direction of the translational velocity vector ($\vec{V}_{Tran}$). In another example, the translational velocity vector ($\vec{V}_{Tran}$) can be determined directly from longitudinal and lateral velocities of the vehicle detected by sensors 252 and/or vehicle systems 258. A slip velocity vector ($\vec{V}_{slip}$) can be estimated from the wheel slip and environment situation data associated with the contextual environment in which the vehicle operates (e.g., from environmental sensors 228). The environmental situation data may include road path, coefficient of friction between the road and tires, etc. In another example, slip velocity vector ($\vec{V}_{slip}$) can be determined from sensors 252 and/or vehicle systems 258 (e.g., wheel spin sensors 216). Using the translational velocity vector ($\vec{V}_{Tran}$) and the slip velocity vector ($\vec{V}_{slip}$), operation 604 can determine a threshold wheelspeed as a maximum allowable rotational velocity ($\omega$) from a known tire radius (R) and a threshold allowable force angle ($\gamma$) associated with the current vehicle state.

During the drift maneuver, at operation 606, a driver's throttle command is received. In some embodiments, the driver's throttle command may be responsive to increased pressure on the accelerator pedal requesting an increase in throttle operation amount in an attempt to increase accelerator and vehicle speed. In another embodiment, the driver's throttle command may be issued by an automated/assisted driving system.

In either case, upon reception of a driver's throttle command that requests an increase throttle operation amount, at operation 608, a determination is made as to whether the driver's throttle command would transition the vehicle into an uncontrollable drift (e.g., beyond the stability boundary 550 of FIG. 5). In the example of FIG. 6, the throttle operation amount of the driver's throttle command is converted to a requested wheelspeed. That is, the requested increase in throttle operation amount can be converted to an increase in engine torque, which can be mapped (e.g., translated or converted) to an amount of requested wheel torque and wheelspeed, for a known tire radius, necessary to propel the vehicle according to the increased throttle.

Operation 608 then compares the requested wheelspeed to the threshold wheelspeed. If the requested wheelspeed is less than or equal to the threshold wheelspeed, at operation 610, the driver's throttle command is executed without intervening corrective assistance. Put another way, since the requested wheelspeed is less than or equal to the threshold wheelspeed, the requested vehicle state would be within the controllable drift driving region 520 of FIG. 5 and the driver is permitted to execute the requested increase in throttle operation amount.

If the requested wheelspeed is greater than the threshold wheelspeed, at operation 613, corrective assistance in the form of an alternative throttle command to provide decreased wheelspeed. For example, corrective assistance can be provided by computing an alternative throttle operation amount that provides a wheelspeed corresponding to a vehicle state within the controllable drift driving region 520 of FIG. 5. In one embodiment, operation 612 can determine a wheelspeed that is equal to or less than the threshold wheelspeed and compute a throttle operation amount that provides the determined wheelspeed. In another embodiment, operation 613 may reject the driver's throttle command and continue operating at the vehicle states estimated in operation 604. In either case, operation 613 may provide corrective assistance by sending control signals to actuators of the vehicle to effectuate the alternative throttle command. For example, the autonomous/assisted driving system may send control signals to the throttle actuator (e.g., modulate throttle to the alternative throttle operation amount) in order to keep the vehicle in a controllable drift. In another example, a brake actuator (e.g., modulate braking) may be controlled. More generally, operation 613 may send control signals to any combination of the throttle, steering, brake, and clutch actuators of a vehicle in order to keep the vehicle within a controllable drift.

Figure 7A:
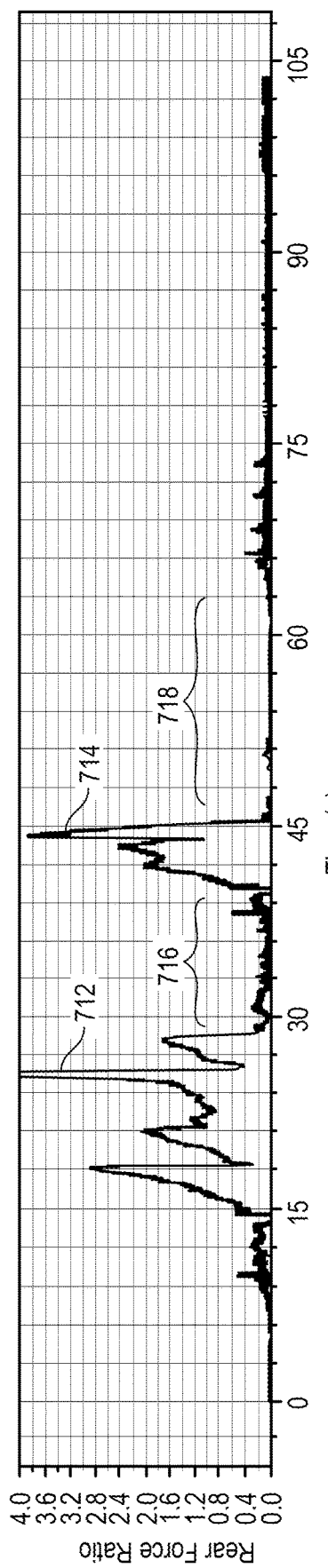
FIGS. 7A and 7B is a graph showing an example rear force ratio for a period of time according to an example implementation of the present disclosure.
Figure 7B:
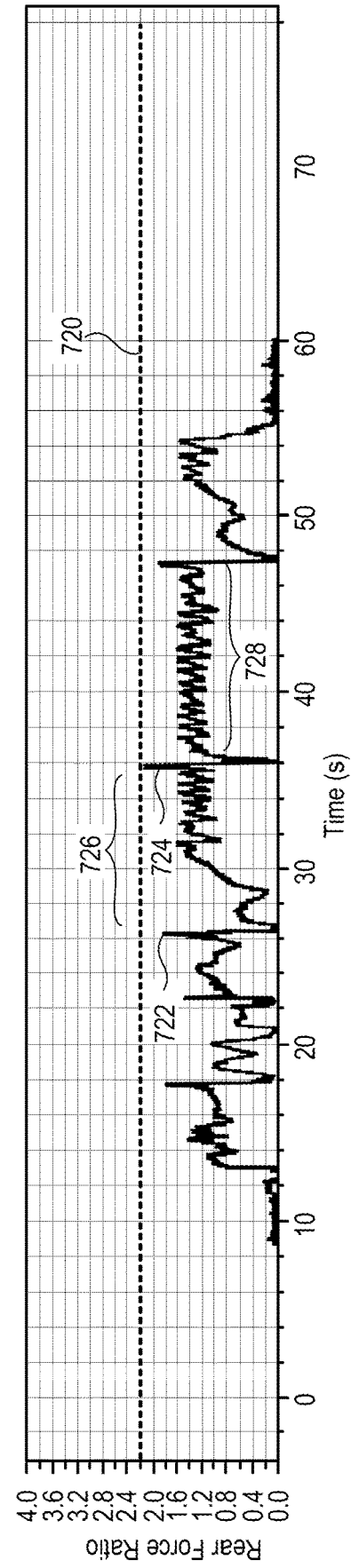

FIGS. 7A and 7B is a graph showing an example rear force ratio for a period of time according to an example implementation of the present disclosure. FIGS. 7A and 7B represent example data from a vehicle while driving and purposefully creating and maintaining vehicle drift by using the throttle to create purposeful rear tire longitudinal slip. FIG. 7A shows example data obtain where corrective assistance does not intervene, and FIG. 7B shows example data where corrective assistance does intervene.

As shown in FIG. 7A, high rear force ratio peaks 712 and 714 are followed by low rear force ratio regions 716 and 718. The high rear force ratio peak 714 depicts an instance where high rear tire longitudinal slip (e.g., vehicle spin) occurred, followed by a recover time shown as region 718. That is, at peak 714, the driver is unable to recover from an uncontrollable drift maneuver. Whereas, FIG. 7B shows peaks 722 and 724 that are below a threshold 720, which corresponds to a set threshold force angle (or wheelspeed) so that the vehicle does not transition to an uncontrollable drift condition. As a result, as can be seen from FIG. 7B, the vehicle is able to continue with controllable drift maneuvers during regions 726 and 728.

Figure 8:
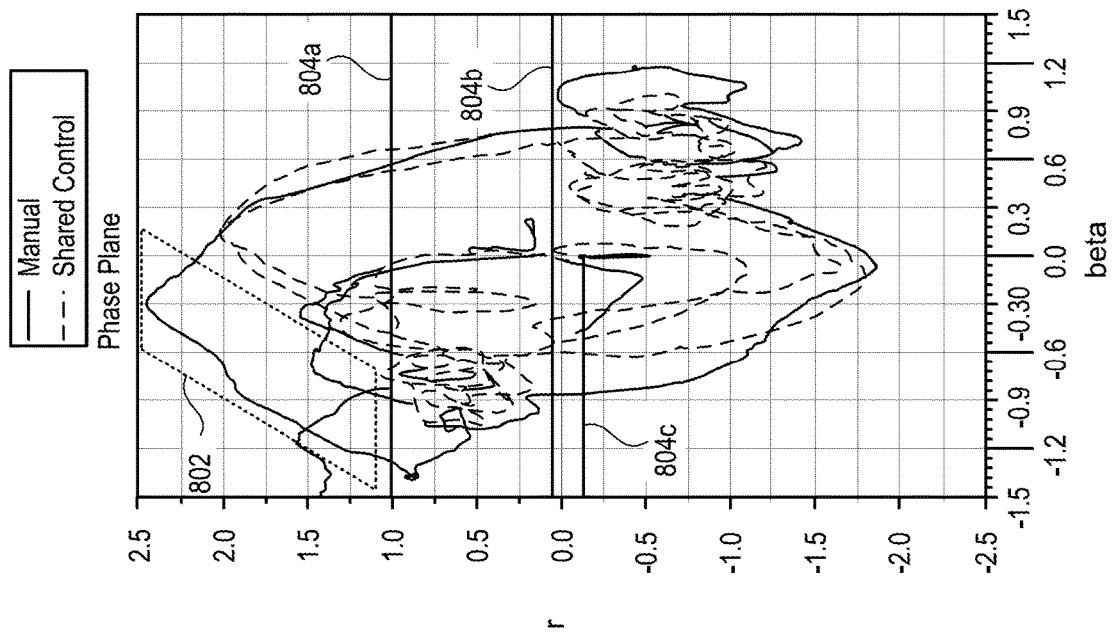
FIG. 8 is a phase plane graph showing an example vehicle state space according to an example implementation of the present disclosure.

FIG. 8 is a phase plane graph showing an example vehicle state space according to an example implementation of the present disclosure. FIG. 8 represents example data from a vehicle while driving. FIG. 8 shows first vehicle states for a manually controlled drift, without any corrective assistance, and second vehicle states for a shared control drift where corrective assistance intervenes according to process 600 of FIG. 6. The vehicle states are plotted as sideslip angle (B) as a function of yaw rate (r) provide as rad/s. At region 802, the manually driven vehicle attempts to perform an uncontrollable drift at high sideslip angle, which results in a loss of control shown as lines 804a-804c.

Figure 9:
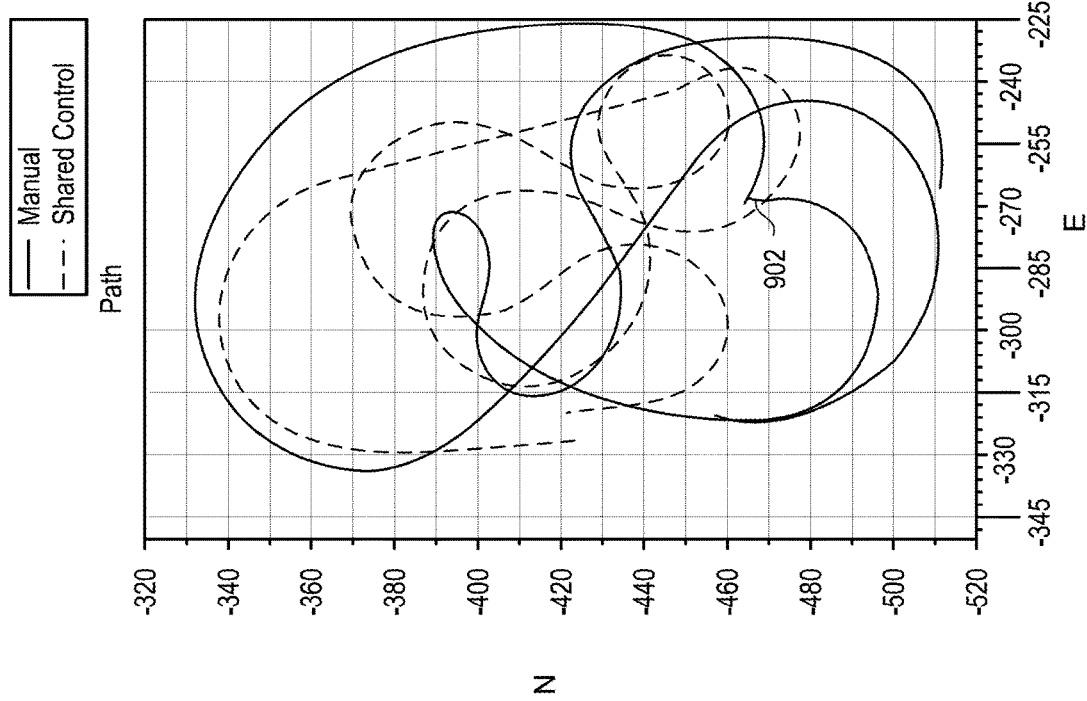
FIG. 9 is a graph showing example travel paths according to an example implementation of the present disclosure.

FIG. 9 is a graph showing example travel paths according to an example implementation of the present disclosure. FIG. 9 represents example data from a vehicle while driving. FIG. 9 shows first vehicle path for a manually controlled drift, without any corrective assistance, and second vehicle path for a shared control drift where corrective assistance intervenes according to process 600 of FIG. 6. The shared control is able to intervene, as described above, so to maintain much more consistent range of yaw rates and sideslip angels, as compared to the manual driven vehicle, even when changing drift direction. Furthermore, from FIG. 9, a loss of control can be seen at point 902 at which point a sudden change in drift direction occurs (e.g., a spin out) and the travel path ends shortly thereafter.

Figure 10:
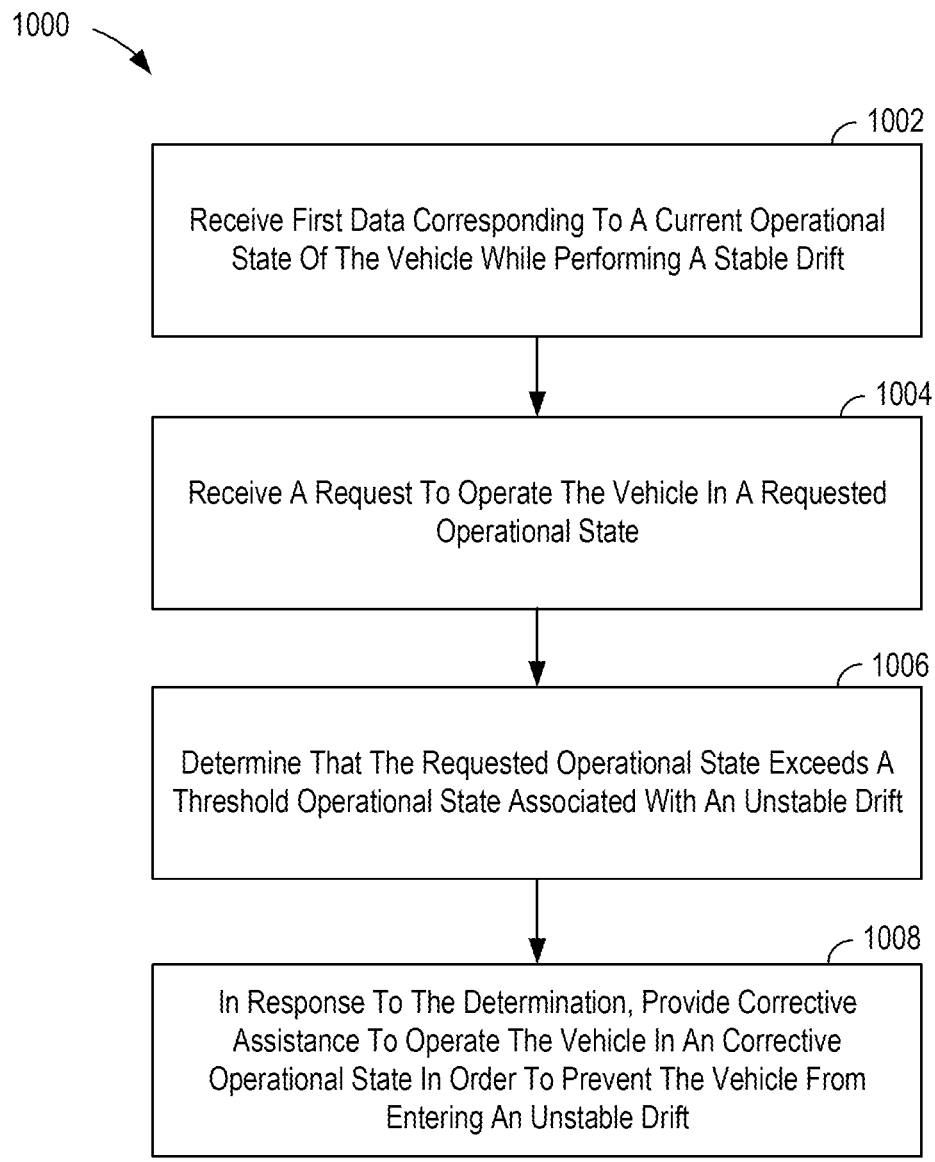
FIG. 10 is another flow chart illustrating example operations for providing corrective assistance to during a drifting maneuver in accordance with various embodiments disclosed herein.

FIG. 10 is another flow chart illustrating example operations for providing corrective assistance to during a drifting maneuver in accordance with various embodiments disclosed herein. FIG. 10 provides a process 1000 that can be executed to maintain stable and safe performance of a drift maneuver, whether initiated by a driver or autonomously. Process 1000 may be implemented as instructions, for example, stored on memory 208, that when executed by processor 206 perform one or more operations of process 1000.

At operation 1002, first data corresponding to a current operational state of the vehicle is received while the vehicle is performing a controllable drift. As described above, first data can be received from sensors 252 and/or vehicle systems 258, which can be used to estimate a current operational state of the vehicle (e.g., operational state).

At operation 1004, a request to operate the vehicle in a requested operational data is received. For example, a driver (or autonomous system) may issue a request for increased throttle operation amount, such as by depressing an accelerator pedal. The requested operational state may comprise the increased throttle operation amount, along with additional vehicle states of operating conditions of the vehicle.

At operation 1006, a determination is made that the requested operational state exceeds a threshold operational state associated with an uncontrollable drift. For example, as described above in more detail, a threshold operational state may be computed based on a maximum allowable drift angle set for the vehicle that corresponds to the current operational state. As described above, maximum allowable drift angle may be based on a Maximum Phase Recovery Envelope for the vehicle. In an illustrative example, the threshold operational state comprises a threshold wheelspeed that can be derived from a threshold force angle ($\gamma$) corresponding to the maximum allowable drift angle. A requested wheelspeed can be determined from the throttle operation amount of the requested operational state, and compared to the threshold wheelspeed.

At operation 1008, responsive to the determination at operation 1006, corrective assistance can be provided to operate the vehicle in a corrective operational state so to prevent the vehicle from entering an uncontrollable drift. For example, a corrective operational state can be provided as a corrective wheelspeed (also referred to as an alternative wheelspeed) that is determined to provide a decrease in wheelspeed relative to the requested wheelspeed. From the corrective wheelspeed, a corrective throttle operation amount can be determined and used to control one or more actuators (e.g., a throttle actuator in this example) of the vehicle to effectuate the corrective throttle operation amount.

As described above, if requested operational state is less than or equal to the threshold operational state, the process 1000 may permit the vehicle to be operated according to the requested operational state without intervening corrective assistance. Put another way, since the requested operational state would not result in an uncontrollable drift, the vehicle can be placed in the requested operational state by controlling one or more actuators so to provide the requested throttle operation amount.

Figure 11:
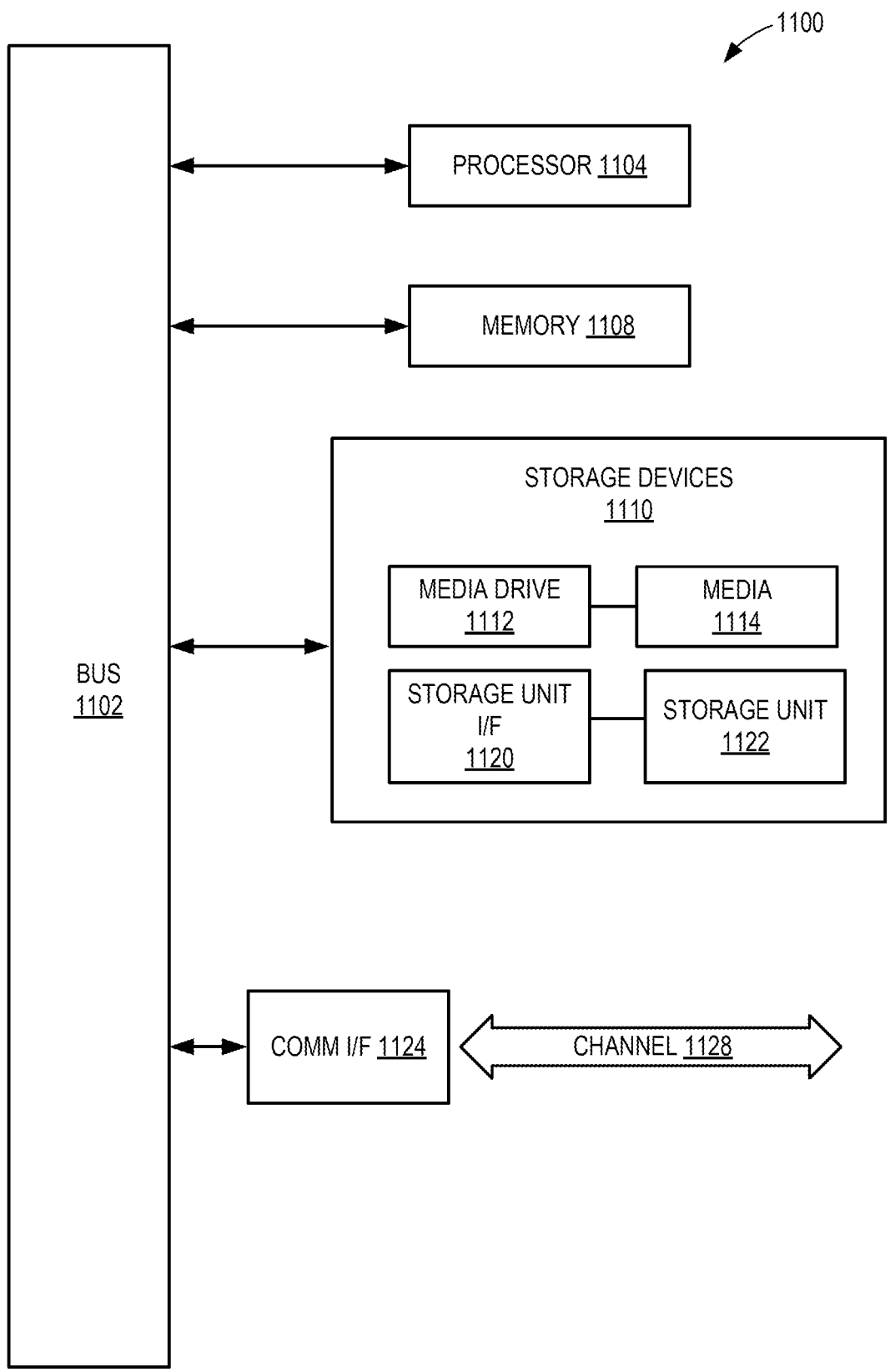
FIG. 11 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 11. Various embodiments are described in terms of this example-computing component 1100. After reading this description, it will become apparent to a person skilled in the relevant art how to implement the application using other computing components or architectures.

Referring now to FIG. 11, computing component 1100 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1100 might also represent computing capabilities embedded within or otherwise available to a given device. For example, a computing component might be found in other electronic devices such as, for example, portable computing devices, and other electronic devices that might include some form of processing capability.

Computing component 1100 might include, for example, one or more processors, controllers, control components, or other processing devices. This can include a processor, and/or any one or more of the components making up corrective assistance system 200 of FIG. 2. Processor 1104 might be implemented using a general-purpose or special-purpose processing engine such as, for example, a microprocessor, controller, or other control logic. Processor 1104 may be connected to a bus 1102. However, any communication medium can be used to facilitate interaction with other components of computing component 1100 or to communicate externally.

Computing component 1100 might also include one or more memory components, simply referred to herein as main memory 1108. For example, random access memory (RAM) or other dynamic memory, might be used for storing information and instructions to be executed by processor 1104. Memory 1108 can be configured to store instructions, such as operations of process 600 of FIG. 6. Main memory 1108 might also be used for storing temporary variables or other intermediate information during execution of instructions to be executed by processor 1104. Computing component 1100 might likewise include a read only memory ("ROM") or other static storage device coupled to bus 1102 for storing static information and instructions for processor 1104.

The computing component 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a solid-state drive, a magnetic tape drive, an optical drive, a compact disc (CD) or digital video disc (DVD) drive (R or RW), or other removable or fixed media drive might be provided. Storage media 1114 might include, for example, a hard disk, an integrated circuit assembly, magnetic tape, cartridge, optical disk, a CD or DVD. Storage media 1114 may be any other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing component 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot. Other examples may include a PCMCIA slot and card, and other fixed or removable storage units 1122 and interfaces 1120 that allow software and data to be transferred from storage unit 1122 to computing component 1100.

Computing component 1100 might also include a communications interface 1124. Communications interface 1124 might be used to allow software and data to be transferred between computing component 1100 and external devices. Examples of communications interface 1124 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1124 may be carried on signals, which can be electronic, electromagnetic (which includes optical) or other signals capable of being exchanged by a given communications interface 1124. These signals might be provided to communications interface 1124 via a channel 1128. Channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1108, storage unit 1122, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1100 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
   determining, by a corrective assistance circuit in a vehicle, a current operational state of the vehicle while performing a controllable drift;
   determining, by the corrective assistance circuit, a requested wheelspeed based on a requested increase to a throttle operation amount of the determined current operational state;
   determining, by the corrective assistance circuit, whether the determined requested wheelspeed exceeds a threshold wheelspeed associated with an uncontrollable drift; and
   controlling, by the corrective assistance circuit, one or more actuators of the vehicle according to a corrective wheelspeed when the determined requested wheelspeed exceeds the threshold wheelspeed to prevent the vehicle from entering an uncontrollable drift.

2. The computer-implemented method of claim 1, further comprising:
   computing, by the corrective assistance circuit, the threshold wheelspeed based on the determined current operational state of the vehicle and vehicle settings that provide maximum allowable drift angles for the vehicle.

3. The computer-implemented method of claim 2, wherein the maximum allowable drift angles are based on a stability boundary data corresponding to the vehicle that demarcates controllable drift operational states of the vehicle from uncontrollable drift operational states of the vehicle.

4. The computer-implemented method of claim 3, wherein the stability boundary data is based on a Maximum Phase Recovery Envelope of a vehicle state space corresponding to the vehicle.

5. The computer-implemented method of claim 2, further comprising:
   determining, by the corrective assistance circuit, a threshold force angle based on the maximum allowable drift angles and the determined current operational state of the vehicle; and wherein the threshold wheelspeed is computed from the determined threshold force angle and the determined current operational state of the vehicle.

6. The computer-implemented method of claim 1, further comprising:
determining, by the corrective assistance circuit, the corrective wheelspeed as a wheelspeed that is less than or equal to the threshold wheelspeed.

7. The computer-implemented method of claim 6, further comprising:
rejecting, by the corrective assistance circuit, the requested increase to the throttle operation amount, and setting, by the corrective assistance circuit, a current wheelspeed of the determined current operational state as the corrective wheelspeed when the determined requested wheelspeed exceeds the threshold wheelspeed.

8. The computer-implemented method of claim 7, wherein the one or more actuators comprise at least a throttle actuator.

9. The computer-implemented method of claim 1, wherein the one or more actuators comprise at least a throttle actuator.

10. The computer-implemented method of claim 1, further comprising:
receiving the requested increase to the throttle operation amount of the determined current operational state from an autonomous driving system of the vehicle.

11. A vehicle, comprising:
a memory storing instructions; and
one or more processors communicably coupled to the memory and configured to execute the instructions to:
determine a current operational state of the vehicle while performing a controllable drift;
determine a requested wheelspeed based on a requested increase to a throttle operation amount of the determined current operational state;
determine whether the determined requested wheelspeed exceeds a threshold wheelspeed associated with an uncontrollable drift; and
control one or more actuators of the vehicle according to a corrective wheelspeed when the determined requested wheelspeed exceeds the threshold wheelspeed to prevent the vehicle from entering an uncontrollable drift.

12. The vehicle of claim 11, wherein the one or more processors are further configured to execute the instructions to:
compute the threshold wheelspeed based on the determined current operational state of the vehicle and vehicle settings that provide maximum allowable drift angles for the vehicle.

13. The vehicle of claim 12, wherein the maximum allowable drift angles are based on a stability boundary data corresponding to the vehicle that demarcates controllable drift operational states of the vehicle from uncontrollable drift operational states of the vehicle.

14. The vehicle of claim 13, wherein the stability boundary data is based on a Maximum Phase Recovery Envelope of a vehicle state space corresponding to the vehicle.

15. The vehicle of claim 12, wherein the one or more processors are further configured to execute the instructions to:
determine a threshold force angle based on the maximum allowable drift angles and the current operational state of the vehicle; and
wherein the threshold wheelspeed is computed from the determined threshold force angle and the determined current operational state of the vehicle.

16. The vehicle of claim 11, wherein the one or more processors are further configured to execute the instructions to:
determine the corrective wheelspeed as a wheelspeed that is less than or equal to the threshold wheelspeed.

17. The vehicle of claim 16, wherein the one or more actuators comprise at least a throttle actuator.

18. The vehicle of claim 11, wherein the one or more processors are further configured to execute the instructions to:
reject the requested increase to the throttle operation amount, and set a current wheelspeed of the determined current operational state as the corrective wheelspeed when the determined requested wheelspeed exceeds the threshold wheelspeed.

19. The vehicle of claim 18, wherein the one or more actuators comprise at least a throttle actuator.

20. The vehicle of claim 11, further comprising:
an autonomous driving system; and
wherein the one or more processors are further configured to execute the instructions to:
receive the requested increase to the throttle operation amount of the determined current operational state from the autonomous driving system.

* * * * *